United States Patent [19]
Hamanaka et al.

[11] Patent Number: 5,847,052
[45] Date of Patent: Dec. 8, 1998

[54] PROCESS FOR PRODUCING THERMOPLASTIC ELASTOMER COMPOSITION

[75] Inventors: Tatsuo Hamanaka, Ichihara; Yuji Goto; Noboru Komine, both of Chiba; Norimasa Oda; Masamichi Ishibashi, both of Hiroshima, all of Japan

[73] Assignee: Sumitomo Chemical Company, Ltd., Osaka, Japan

[21] Appl. No.: 721,958

[22] Filed: Sep. 27, 1996

[30] Foreign Application Priority Data

Sep. 29, 1995 [JP] Japan .................................. 7-253000

[51] Int. Cl.⁶ ................................ C08J 3/24; C08L 23/16
[52] U.S. Cl. .......................... 525/197; 523/319; 523/324; 523/348; 523/353; 524/528; 525/198; 264/211.23; 264/211.24
[58] Field of Search ..................................... 525/197, 198; 524/528; 523/319, 324, 348, 353; 264/211.23, 211.24

[56] References Cited

U.S. PATENT DOCUMENTS

| | | | |
|---|---|---|---|
| 3,806,558 | 4/1974 | Fischer | 264/211.24 |
| 4,454,092 | 6/1984 | Shimizu et al. | 264/211.24 |
| 4,594,390 | 6/1986 | Abdou-Sabet et al. | 525/232 |
| 5,298,211 | 3/1994 | Hamanaka et al. | 264/349 |
| 5,587,434 | 12/1996 | McCullough et al. | 525/333.8 |

*Primary Examiner*—Andrew E. C. Merriam
*Attorney, Agent, or Firm*—Birch, Stewart, Kolasch & Birch, LLP

[57] ABSTRACT

A process for producing a thermoplastic elastomer composition which comprises dynamically cross-linking an olefine copolymer rubber and an olefine plastic using a twin-screw extruder, said process being characterized in that said twin-screw extruder comprises one or more kneading zones within a dynamically cross-linking area and the first kneading zone among said zones comprises a screw with forward kneading disks having a minimum thickness ($T_{min}$) of less than 13 mm per disk. Said method enables production of a thermoplastic elastomer composition of good quality regardless of the scale of production.

10 Claims, 6 Drawing Sheets

▨ corresponds the portion "a" in the following figures.

Upstream side is upward of this paper.

▨ corresponds the portion "a" in the following figures.

Upstream side is upward of this paper.

▨ corresponds the portion "a" in the following figures.

Upstream side is upward of this paper.

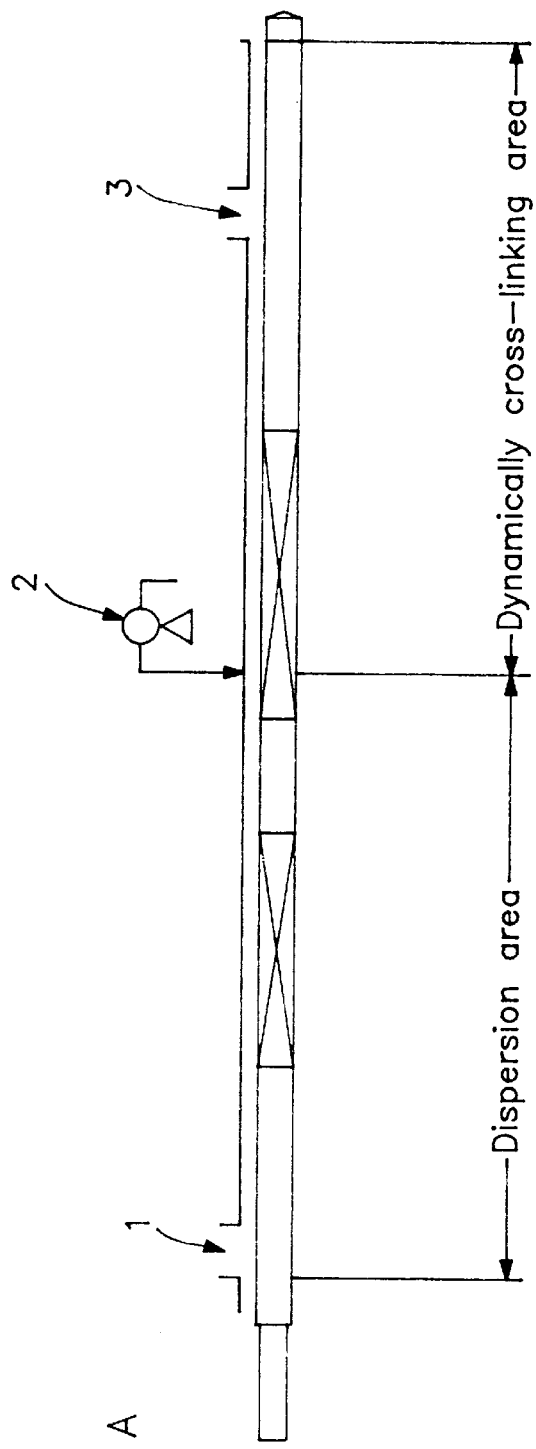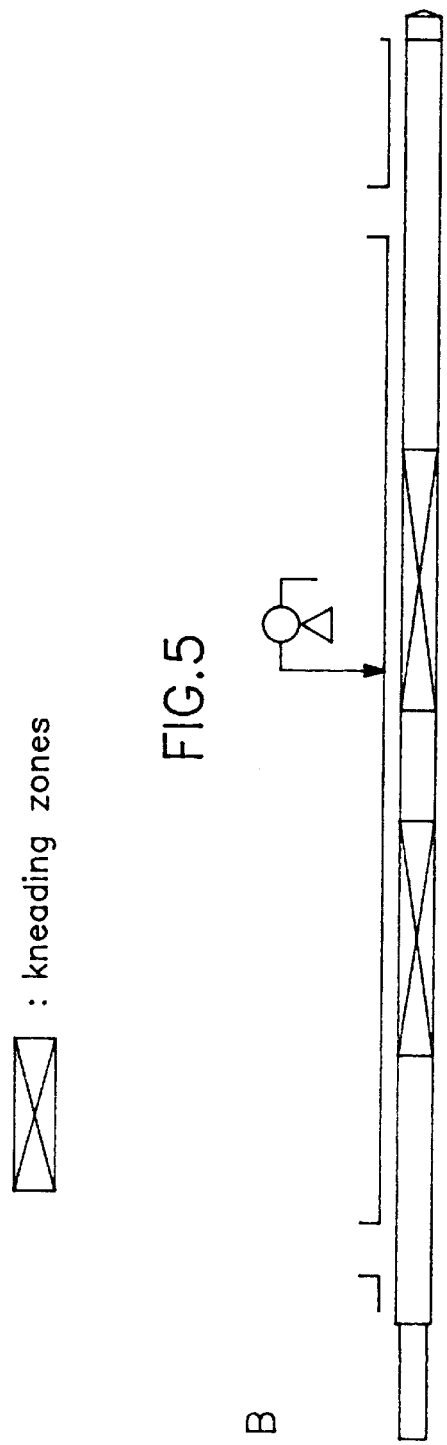

2

PROCESS FOR PRODUCING THERMOPLASTIC ELASTOMER COMPOSITION

BACKGROUND OF THE INVENTION

1. Field of the Invention

The present invention relates to a process for producing a thermoplastic elastomer composition from an olefine copolymer rubber and an olefine plastic. More precisely, the present invention relates to a process for producing a thermoplastic elastomer composition which comprises dynamically cross-linking an olefine copolymer rubber and an olefine plastic using a specific twin-screw extruder.

2. Background Information

Thermoplastic elastomers (hereinafter, referred to as "TPE") have found wide application in industrial products including automobile parts, electric appliance parts and sundry goods because of characteristics that they need no vulcanization step and that they can be processed using a conventional molding machine for thermoplastic resin. Among them, olefinic TPE has obtained a general reputation that it is light weight, recyclable and chlorine free, hence environmentally acceptable, material. As a result, olefinic TPE composition has recently attracted special interest as an alternative material for automotive interior finish skin for which plasticized vinyl chloride resin has been mainly used conventionally.

The process for producing olefinic TPE is already known by JP-A-48-26838. When such material is used in a thin sheet form such as automotive interior skin or in a portion which may directly attract consumer's attention, its external appearance and smoothness of surface are very important. More particularly, the material cannot be used in such use if cross-linking gel portion of said material forms small projections generally called fish eye or the like or causes surface roughening, if without a cross-linking-treatment, there is not any problem like that. Problems such as disappearance of texture pattern or appearance of gloss may occur during the heat treatment step (ex. vacuum forming).

In order to solve the above-mentioned problem, a process for producing a thermoplastic elastomer composition by melt kneading an olefine copolymer rubber, an olefine plastic and a reactant using a twin-screw extruder is proposed in JP-A-58-25340.

Even by this method, however, external appearance of the product is often bad and products of sufficient quality cannot be obtained.

It is considered that the problem of external appearance is caused by insufficient dispersion of the rubber, plastic and reactant. For improvement of dispersion, known methods include a method in which shear rate is increased by speeding up the rotation of the screw and a method in which a kneading zone comprising a segment called kneading disks or rotors is inserted midway.

However, mere speeding up of rotation or insertion of a kneading zone having kneading disks, etc. causes an elevation of the temperature of the material under that is being kneaded. As a result, a good composition is not obtained due an unbalance between the dispersion and the reaction rate which is increased by the elevation of temperature.

In this connection, application of an indicator such as specific energy generally used in resin compounding is inadequate. Therefore, even if no problem has arisen in a small scale production for research purposes, a problem has arisen that a product of good quality cannot be obtained when a large scale production for commercialization is carried out using a merely enlarged similar apparatus. This is particularly remarkable in a production accompanying cross-linking like the present invention.

In other words, the quality is lowered as the increase in scale of an extruder used in the production and therefore application of the process to the above use has been difficult.

The purpose of the present invention is to provide a process for producing olefinic thermoplastic elastomer of good quality which is effective regardless of the scale of production.

After an extensive research aimed at solving the above described problems arisen in the conventional methods, the present inventors have found that a thermoplastic elastomer composition of good quality can be obtained regardless of the scale of production when a specific twin-screw extruder is used in the production of thermoplastic elastomer composition by dynamically cross-linking an olefine copolymer rubber and an olefine plastic and have completed the present invention.

SUMMARY OF THE INVENTION

The present invention provides a process for producing a thermoplastic elastomer composition which comprises dynamically cross-linking an olefinic copolymer rubber and an olefinic plastic using a twin-screw extruder which comprises one or more kneading zones within a dynamically cross-linking area and in which the first kneading zone among said zones comprises a screw with forward kneading disks having a minimum thickness ($T_{min}$) of less than 13 mm per disk (hereinafter, this process is referred to as Process I).

Also, the present invention provides Process I in which the first kneading zone within the dynamically cross-linking area comprises a screw having 10 or more kneading disks.

The present invention also provides Process I in which the twin-screw extruder is one satisfying the following equation:

$$+\alpha/T > 1.5$$

wherein α is the number of forward kneading disks in the first kneading zone within the dynamically cross-linking area, and T is an average thickness (mm) per forward kneading disk in the first kneading zone within the dynamically cross-linking area (hereinafter, this process is referred to as Process II).

In addition, the present invention provides Process I in which the twin-screw extruder is one satisfying the following equation:

$$\alpha \times \beta \times \gamma / T > 100$$

wherein
- α is the number of forward kneading disks in the first kneading zone within the dynamically cross-linking area,
- β is the number of kneading zones within the dynamically cross-linking area,
- γ is a shear rate ($sec^{-1}$) in the kneading disk region in the kneading zones within the dynamically cross-linking area, and T is an average thickness (mm) per forward kneading disk in the first kneading zone within the dynamically cross-linking area (hereinafter, this process is referred to as Process III).

Further, the present invention provides Process II or III in which the maximum shear rate provided by kneading within the dynamically cross-linking area in the twin-screw extruder is 500 sec$^{-1}$ or more and less than 2,000 sec$^{-1}$.

Still, the present invention provides Process II or III in which the olefine copolymer rubber and the olefine plastic are previously melt kneaded in the upstream of the twin-screw extruder and then an organic peroxide is fed in the downstream thereof to effect cross-linking.

Yet, the present invention provides Process II or III in which weight ratio of the olefinic copolymer rubber and the olefinic plastic is 20–95:80–5.

Moreover, the present invention provides Process II or III in which the Mooney viscosity at 100° C. (ML$_{1+4}$100° C.) of the olefinic copolymer rubber is 30–350.

Still further, the present invention provides Process II or III in which the olefine copolymer rubber is an oil extended olefinic copolymer rubber.

Yet further, the present invention provides Process II or III in which the olefine plastic is polypropylene or a propylene-α-olefine copolymer.

BRIEF DESCRIPTION OF DRAWINGS

FIG. 4 is a schematic view of screw pattern A.

FIG. 5 is a schematic view of screw pattern B.

In FIGS. 1 is a first supply port, 2 is a second supply port (plunger pump etc.) and 3 is a vent port.

DETAILED DESCRIPTION OF THE INVENTION

The twin-screw extruder used in the present invention is also called twin-screw kneader, preferably of continuous type. It includes, for example, twin-screw extruder equipped with a screw designed to have a function of improved kneading ability, typically TEX series manufactured by The Japan Steel Works, LTD.

Example of the twin-screw extruder used in the present invention has, as shown in FIG. 4, a cylinder with at least two supply ports (a first supply port 1 and a second supply port 2), a vent port 3 and a die, and two screws having a dispersion areas and a dynamically cross-linking areas. There are one or more kneading zones in each of said dispersion area and dynamically cross-linking area.

The supply ports are an inlet for supplying the olefine copolymer rubber and the olefine plastic into the twin-screw extruder and also an inlet for supplying the reacting agent into the twin-screw extruder.

The vent port is an outlet for discharging gaseous substance generated by melt-kneading of materials.

The die is a metallic mold mounted on the top of the twin-screw extruder and exchanged according to desired shape of the product.

The dispersion area is an area kneading and supplying a mixture of materials fed from the supply port to the dynamically cross-linking area.

The dynamically cross-linking area is an area in which the dynamic cross-linking is completed by adding the reacting agent to the kneaded mixture, followed by continuing kneading.

The rotation of the screws may be any of the same direction type or different direction type and number of groove may be any of two-grooved type, three grooved type or other.

It is preferred that the twin-screw extruder used in the present invention has a structure allowing to add liquid or powder substance at midway.

Further, it is preferred to select an extruder which allows control of temperature because the present invention is directed to a method for producing a thermoplastic elastomer by dynamic cross-linking conducted in the twin-screw extruder.

The twin-screw extruder used in the present invention has kneading disks in its kneading zone.

Figure 1A:
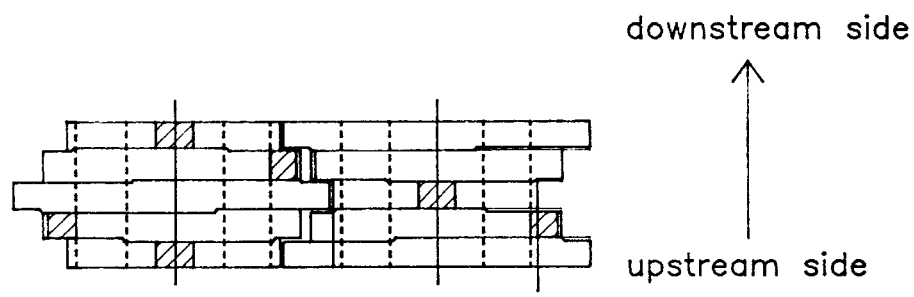
FIG. 1 is a schematic view of forward kneading disks.
Figure 1B:
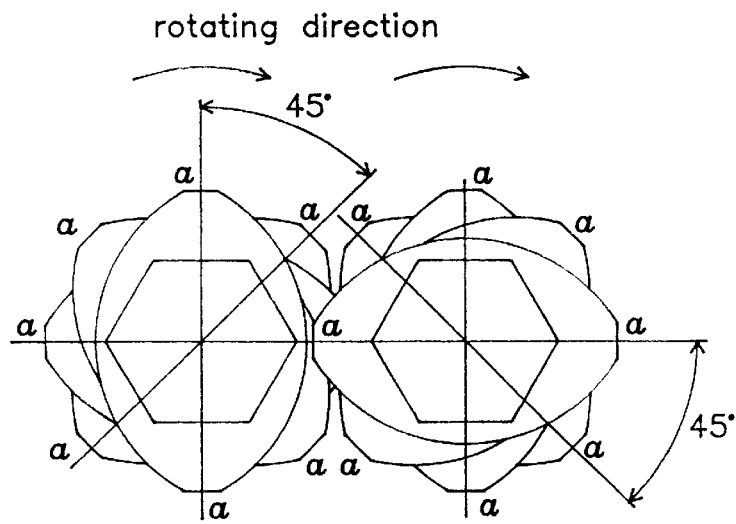
Figure 2A:
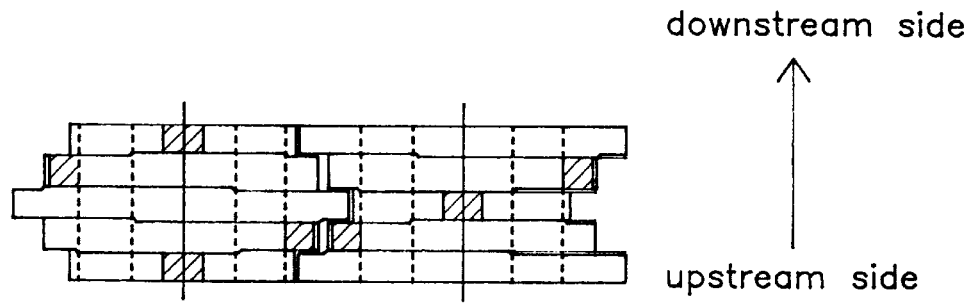
FIG. 2 is a schematic view of backward kneading disks.
Figure 2B:
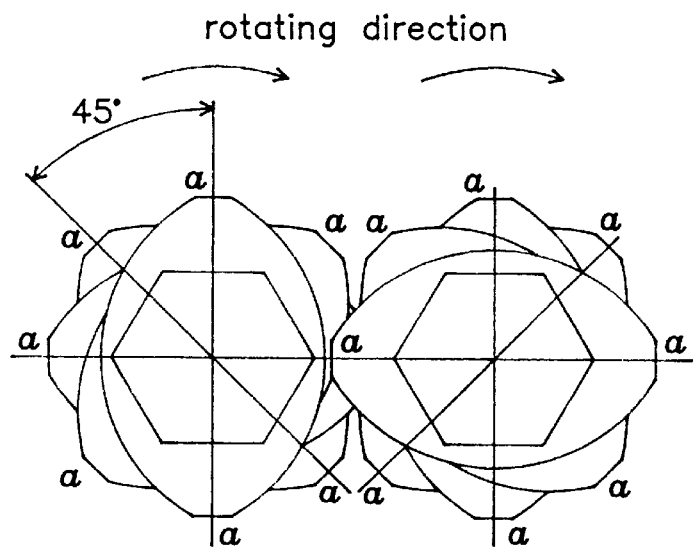
Figure 3A:
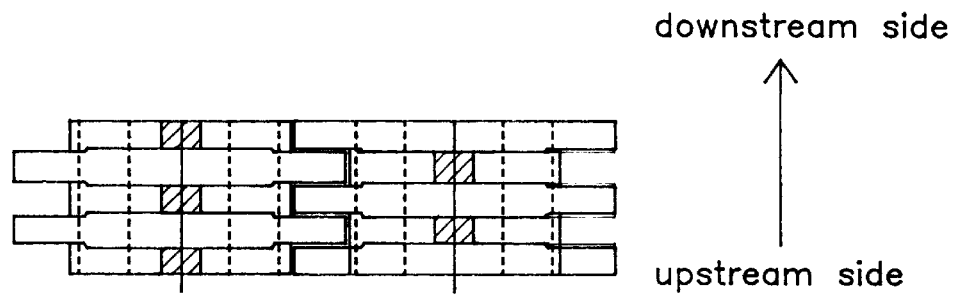
FIG. 3 is a schematic view of perpendicularly intersecting kneading disks.
Figure 3B:
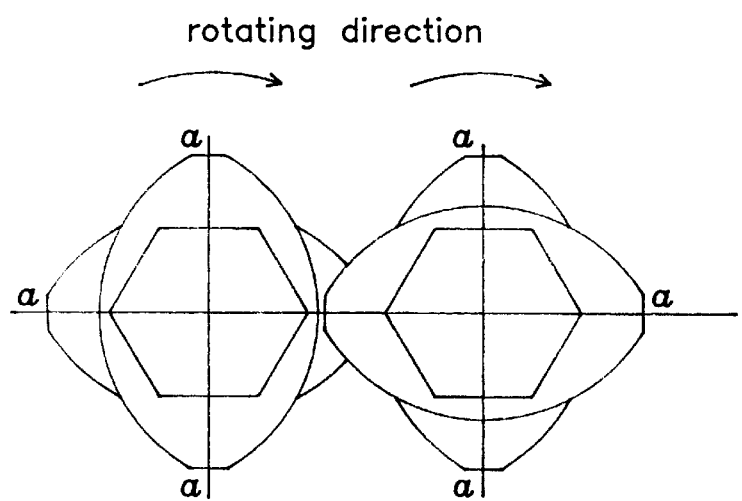

Usually, plural kneading disks are piled and their action varies depending on thickness and relation between adjacent disks. For example, they may be forward kneading disks shifting in the forward direction as shown in FIG. 1, backward kneading disks shifting in the backward direction as shown in FIG. 2, perpendicularly intersecting kneading disks in which twin screws shift the phase by 90 and having no forward or backward action as shown in FIG. 3 and the like.

The kneading disks in the dispersion area of the twin-screw extruder used in the present invention is not particularly limited and may be the forward kneading disks, backward kneading disks or perpendicularly intersecting kneading disks and they may be used in combination.

Now illustration is given on the specific process for obtaining the thermoplastic elastomer composition by dynamically cross-linking the olefinic copolymer rubber and the olefinic plastic using a twin-screw extruder.

First, the olefinic copolymer rubber and the olefinic plastic are fed from the supply port into the twin-screw extruder in a specific ratio and they are melt kneaded. These may be previously mixed in solid state by a mixer such as a Henschel mixer, a tumbler mixer or the like, or may be previously mixed in molten state by a Banbury mixer, a continuous kneader or the like. From the economical view point, however, they may be fed independently without previous mixing or kneading.

The olefinic copolymer rubber and the olefinic plastic may be fed from the same supply port or from different supply ports.

The olefine copolymer rubber used in the present invention is an amorphous random elastic copolymer containing an olefine as the main component and includes, for example, ethylene-propylene copolymer rubber, ethylene-propylene-unconjugated diene rubber, ethylene-butene-1-unconjugated diene rubber and propylene-butene-1-copolymer rubber. Among them, ethylene-propylene-unconjugated diene rubber and ethylene-propylene copolymer rubber are preferably used.

Said unconjugated diene includes, for example, dicyclopentadiene, 1,4-hexadiene, cyclooctadiene, methylene-norbornene and ethylidenenorbornene. Among them, ethylidenenorbornene is preferably used.

More specific examples of the olefinic copolymer rubber used in the present invention include ethylene-propyleneethylidenenorbornene copolymer rubber having a propylene content of 10–55% by weight, preferably 20–40% by weight, an ethylidenenorbornene content of 1–30% by weight, preferably 3–20% by weight.

The Mooney viscosity at 100° C. (ML$_{1+4}$100° C.) of the olefinic copolymer rubber used in the present invention is preferably 30–350, more preferably 120–350 and most preferably 140–300.

In the present invention, a mineral oil plasticizer may be used as required. Said mineral oil plasticizer may be fed from any position of the extruder and may be used in the form of an oil extended olefinic copolymer rubber.

When the Mooney viscosity at 100° C. ($ML_{1+4}$100° C.) of the olefinic copolymer rubber is 30–80, the former method is preferred and when the Mooney viscosity at 100° C. ($ML_{1+4}$100° C.) is 150–350, the latter method is preferred.

When the oil extended olefine copolymer rubber is used in the present invention and the Mooney viscosity of the olefinic copolymer rubber is 150–350, said oil extended copolymer rubber preferably contains 20–150 parts by weight, more preferably 30–120 parts by weight, of the mineral oil plasticizer per 100 parts by weight of the olefinic copolymer rubber. The amount of less than 20 parts by weight is not preferred because the flowability of the olefinic TPE composition is lowered and particularly extrusion processibility and injection molding properties are damaged. Also, the amount of more than 150 parts by weight is not preferred because plasticity is unnecessarily increased to lower the processibility and, in addition, properties including physical properties of the product is lowered.

The Mooney viscosity at 100° C. ($ML_{1+4}$100° C.) of the oil extended olefine copolymer rubber is preferably 30–150 and more preferably 40–100.

The mineral oil plasticizer used in the oil extended olefine copolymer rubber includes, for example, a high boiling petroleum fraction such as paraffin, naphthene and aromatic series, which is compounded in order to improve processibility or mechanical properties. Preferred one is of paraffin series. A high content of the aromatic component is not preferred because the product is liable to be dirty and use for a transparent or light-colored product is limited.

Oil extension of the olefinic copolymer rubber can be effected by a known method including, for example, a method where the oil extension is effected by mechanically kneading the olefinic copolymer rubber and the mineral oil plasticizer using rolls or a Banbury mixer, and a method in which a prescribed amount of the plasticizer is added to a solution of the olefinic copolymer rubber and then the solvent is removed by a method such as steam stripping. Preferred oil extension method is the method using a solution of the olefinic copolymer rubber. As the solution of the olefinic copolymer rubber, those obtained by polymerization reaction for producing it is conveniently used.

The olefinic plastic used in the present invention is polypropylene or a copolymer of propylene and an α-olefine other than propylene. The olefine other than propylene specifically includes, for example, ethylene, 1-butene, 1-pentene, 3-methyl-1-butene, 1-hexene, 1-decene, 3-methyl-1-pentene, 4-methyl-1-pentene, 1-octene and the like.

The polymer has a melt flow rate within a range preferably of 0.1–100 g/10 minutes and more preferably of 0.5–50 g/10 minutes.

In the present invention, the compounding weight ratio of the olefine copolymer rubber/olefine plastic is preferably 20–95/80–5, more preferably 35–90/65–10 and most preferably 50–90/50–10.

The kneading temperature in the dispersion area is usually 120° C.–300° C. and should be within a range of temperature at which the olefinic plastic used is in a molten state. If, however, the temperature is too high, control of dynamic cross-linking in the next step becomes difficult. Therefore, it is preferred that the temperature of the resin is as low as possible within the above-mentioned range. When polypropylene, for example, is used as the olefine plastic, preferred temperature is 140° C.–250° C.

The olefinic copolymer rubber and the olefinic plastic are previously melt kneaded at the upstream side of the twin-screw extruder and then dynamically cross-linked at the downstream side of the same twin-screw extruder feeding reacting agent, for example, by plunger pump. As the reacting agent, a compound capable of cross-linking the olefinic copolymer rubber (cross-linking agent) such as organic peroxides and phenol resin can be used. When a cross-linking agent having a slow cross-linking velocity is used, a method can be adopted in which the cross-linking agent is added in the upstream side of the twin-screw extruder and an accelerator is added in the downstream side, the cross-linking step. Preferred cross-linking agent is an organic peroxide.

The organic peroxides include, for example, 2,5dimethyl-2,5-di(t-butylperoxy)hexane, 2,5-dimethyl-2,5-di(t-butylperoxy)-hexyne-3, 1,3-bis(t-butylperoxyisopropyl) benzene, 1,1-di(t-butylperoxy)-3,5,5-trimethylcyclohexane, 2,5-dimethyl-2,5-di(peroxybenzoyl)hexyne-3, dicumyl peroxide and the like. Among them, 2,5-dimethyl-2,5-di(t-butylperoxy)hexane is preferred from the viewpoint of odor problem and scorching property.

The amount of the organic peroxide is within a range of 0.005–2 parts by weight and preferably of 0.01–0.6 part by weight per 100 parts by weight of the total amount of the olefinic copolymer rubber and the olefinic plastic. If the amount is less than 0.005 part by weight, effect by cross-linking reaction is too small and if the amount exceeds 2 parts by weight, control of the reaction is difficult and economically disadvantageous.

A cross-linking aid may be used in the course of the dynamic cross-linking by an organic peroxide in the production of the present composition of the present invention. The cross-linking aid includes,for example, peroxide cross-linking aids such as N,N'-m-phenylene bismaleimide, toluene bismaleimide-p-quinone dioxime, nitrobenzene, diphenylguanidine and trimethylolpropane and polyfunctional vinyl monomers such as divinyl benzene, ethylene glycol dimethacrylate, polyethylene glycol dimethacrylate, trimethylolpropane trimethacrylate and allyl methacrylate. Adding such compound, a uniform and moderate cross-linking reaction and a reaction between the olefinic copolymer rubber and the olefinic plastic can be carried out and improvement of mechanical strength can be attained.

The amount of the cross-linking aid is within a range of 0.01–4 parts by weight and preferably of 0.05–2 parts by weight per 100 parts by weight of the total amount of the olefine copolymer rubber and the olefine plastic. If the amount is less than 0.01 parts by weight, the desired effect cannot be obtained. Exceeding 4 parts by weight is economically disadvantageous.

The reacting agent including cross-linking agents, accelerators and cross-linking aids, used in the present invention, may be either in liquid or powder forms. Further, since dispersion of the reacting agent is very important, it is preferred to dilute the reacting agent with a diluent inert to the cross-linking reaction such as inorganic filler, mineral oil, solvent or the like. In addition, it is preferred to add the reacting agent in the form of liquid rather than powder. Particularly preferred diluent is paraffin oil in view of easy handling and effect to the product.

The area between the position of supplying the reacting agent and the outlet of the twin-screw extruder (downstream side) is called dynamically cross-linking area.

A substantial dynamic cross-linking is effected in this area.

Following three points are important in the dynamically cross-linking area:

(1) The reacting agent is well dispersed in the material under kneading before the reaction is terminated.

(2) The reaction is completed in the area.

(3) The reaction is carried out under shearing to secure cross-linking properties keeping flowability and good external appearance.

In order to effectively attain these points, enhanced mixing, dispersion and shearing as well as suppression of excessive generation of heat are important. Usual means for enhancement of mixing, dispersion and shearing is increase in number of kneading disks and increase in shear rate during kneading. However, these adversely affect suppression of generation of heat.

According to the present invention, both of enhancement of mixing, dispersion and shearing and suppression of generation of heat can be attained by using a specific screw and carrying out the kneading and reaction under specific conditions.

Particularly important point in the dynamically cross-linking area is the sufficient dispersion of the reacting agent in the material under kneading before the reaction.

In the present invention, forward kneading disks having a high dispersing (distributing) effect of the material and a small generation of heat is used for obtaining thermoplastic elastomer composition of favorable quality in the dynamically cross-linking area regardless of the production scale.

The dynamically cross-linking area in the present invention has one or more kneading zones and characterized in the forward kneading disks installed in the first kneading zone.

In particular, by installing a screw with forward kneading disks having a minimum thickness ($T_{min}$) of less than 13 mm per disk, the thermoplastic elastomer composition of good quality can be obtained even if the twin-screw extruder has a large size and the productive capacity becomes larger.

The thickness is preferably as thin as possible but preferably has at least a thickness of 1.5 mm or more and preferably a thickness of at least 0.05 times the outer diameter of screw flight of the twin-screw extruder or more in order to hold mechanical strength.

A larger number of the forward kneading disks is more preferred because of higher distributing (flow dividing) effect but an extremely large number of disks results in the generation of much heat and insufficient action.

Therefore, the twin-screw extruder in the present invention can be effectively used by having one or more kneading zone in the dynamically cross-linking area and a full flight type screw inserted between them. Whether or not the kneading zone needs to be divided should be decided in order to avoid excessive rise in temperature or in pressure which may be caused by the kneading disks including forward disks and other disks.

In the present invention, the first kneading zone in the dynamically cross-linking area is composed of a screw having 10 or more kneading disks, uppermost 200 or less kneading disks, preferably 15 or more and more preferably 20 or more kneading disks.

The number of the forward kneading disks is not limited as long as excessive rise in temperature or pressure can be avoided. Preferably, when three grooved type screws are used, 10 disks or more and more preferably 15 disks or more are installed. When two grooved type screws are used, the number is preferably double of that of three grooved type.

It is preferred that, when $\alpha$ is the number of foward kneading disks of the first kneading zone within the dynamically cross-linking area, and T is an average thickness (mm) per forward kneading disk in the first kneading zone within the dynamically cross-linking area, the extruder has a screw constitution satisfying a relation $1.5<\alpha/T$, because a good quality is attained. More preferably, the extruder has a screw constitution satisfying a relation: $1.5<\alpha/T<70$.

In the present invention, a product of good quality can be preferably obtained irrespective of scale and other producing conditions when a twin-screw extruder satisfying the condition: $100<\alpha\times\beta\times\gamma/T$ is used. More preferred twin-screw extruder satisfies the condition: $100<\alpha\times\beta\times\gamma/T<700,000$.

In the above relation, $\alpha$ is the number of forward kneading disks of the first kneading zone within the dynamically cross-linking area. If adjacent forward kneading disks have the same phase, this couple is counted as a single disk. Even when adjacent kneading disks have the same phase, if, however, their forward action are different (for example, one is a forward kneading disk and the other is a backward kneading disk), they are counted as two disks.

$\beta$ is the number of kneading zones within the dynamically cross-linking area; $\gamma$ is a shear rate ($\sec^{-1}$) in average represented by an equation shown below in the kneading disk region in the kneading zones within the dynamically cross-linking area; and T is an average thickness (mm) per forward kneading disk in the first kneading zone within the dynamically cross-linking area.

$$\text{Shear rate } (\gamma)=[(\pi DN)/H]\times(1/60)$$

The maximum shear rate $\gamma_{max}$ can be calculated by the following equation:

$$\text{Maximum shear rate } (\gamma_{max})=[(\pi DN)/h]\times(1/60)$$

wherein

D: inside diameter of the cylinder (mm)

N: number of rotation of the screw (rpm)

H: maximum space between the cylinder and the screw h: minimum space between the cylinder and the screw According to the present invention, the maximum shear rate provided by kneading within the dynamically cross-linking area, $\gamma_{max}$, is preferably in a range of 500 $\sec^{-1}$ or more and 2,000 $\sec^{-1}$ or less and more preferably 1,000 $\sec^{-1}$ or more and 1,900 $\sec^{-1}$ or less.

While there is a point of view, as disclosed in JP-A-59-58043, that an important shear rate is the maximum shear rate calculated at the edge of the screw and the wall surface of the cylinder, a region in which a higher shear rate is generated partially also produces much shear heat which results in an local uneven reaction and may be a factor contributing to an inferior external appearance.

The prescribed temperature in the dynamically cross-linking area depends on the reacting agent used. When the organic peroxide is used as the reacting agent, it is important that the organic peroxide is exhausted before the outlet of the extruder and the temperature is preferably 150° C. or more and more preferably 150°–300° C. The range of temperature of the material is preferably 180°–290° C. and more preferably 200°–280° C. The temperature of the material around 300° C. may cause decomposition or deterioration by heat, easy abnormal cross-linking, coloring and bad external appearance.

The retention time of the material in the dynamically cross-linking area depends on the scale of the extruder used, temperature, reacting agent, etc. and preferably 10 seconds or more and less than 3 minutes.

In the present invention, an olefinic plastic may be additionally supplied. The supply may be carried out at any of upstream or downstream of the twin-screw extruder and also after the dynamically cross-linking step.

When the cross-linking aid is used in the present invention, it is preferred to add the aid before or simultaneous to the addition of other reacting agents.

If necessary, inorganic filler, antioxidant, weather resistant agent, antistatic, lubricant, color pigment or the like can be added in the present invention and as long as they do not inhibit the cross-linking reaction, they can be added at any portion of the twin-screw extruder.

Also, in the present invention, the mineral oil plasticizer may be added at any portion of the twin-screw extruder, though, when a large amount of the plasticizer is added, it is preferred that the plasticizer is added from a number of inlets. And, the plasticizer may be added preferably in the form of oil extended olefine copolymer rubber as mentioned above.

The application of the olefinic TPE composition according to the present invention includes interior components for automotive parts such as ceiling skin, instrument-panel skin, door skin and so on. Other automobile related use includes part which attracts directly consumer's attention and for which external appearance is important such as weather strip, side molding, air spoiler and the like.

Further preferred use includes household electric appliance, wall paper, sheet for construction, sporting goods or the like.

As described above, the present invention provides a process for producing thermoplastic elastomer composition of good quality, regardless of the scale of production, by using a specific twin-screw extruder.

Further, products made from the olefinic thermoplastic elastomer composition of the invention has a smooth surface without fish-eye or the like and an excellent external appearance.

EXAMPLES

The present invention will now be illustrated by means of Examples, which should not be construed as a limitation upon the scope of the invention.

Methods of testing used for measuring properties in Examples and Comparative Examples are illustrated below.

(1) Mooney viscosity at 100° C. ($ML_{1+4}$100° C.) of the olefinic copolymer rubber.

Measurement was carried out according to ASTM D927-57T.

For oil extended olefinic copolymer rubber, the Mooney viscosity ($ML_1$) was calculated by the following equation:

$$\log (ML_1/ML_2) = 0.0066(\Delta PHR)$$

$ML_1$: calculated Mooney viscosity
$ML_2$: Mooney viscosity measured according to ASTM D927-57T
$\Delta PHR$: Amount for oil extension per 100 parts by weight of the olefinic copolymer rubber (2) Surface texture of the extruded sheet: An extruder of the type USV 25 mmφ, manufactured by Union Plastics Co., LTD was used.

Using a full flight type screw and T-die, a sheet having a thickness of 0.2 mm was extruded and the surface texture of the sheet was assessed using a 4 grades scoring system.

The scoring criteria is as follows:

⊚: very smooth;
○: smooth;
Δ: slightly rough;
x: rough (3) Fish-eye in the extruded sheet: An extruder of the type USV 25 mmφ, manufactured by Union Plastics Co., LTD was used.

Using a full flight type screw and T-die, a sheet having a thickness of 0.2 mm was extruded and the surface texture of the sheet was visually assessed using a 4 grades scoring system based on the number and size of fish eyes.

The scoring criteria is as follows:

⊚: no fish eye is observed;
○: small number of small fish eyes are observed;
Δ: fish eyes are observed;
x: many fish eyes are observed;

The specifications of the twin-screw extruder used, screw patterns and conditions for production are shown below:

(1) Specifications of the twin-screw extruder

| Name of machine | Number of groove | Inside diameter D of cylinder (mm) | L/D |
|---|---|---|---|
| TEX44BCT | 2 | 47 | 38.5 |
| TEX65XCT | 2 | 69 | 38.5 |
| TEX90XCT | 2 | 96.5 | 38.5 |

Note 1: L is the length of the cylinder and D is the inside diameter of the cylinder.
Note 2: When the screw pattern is E, L/D of TEX90XCT is 42.

Structure of the cylinder is shown in FIG. 4. It has a first supply port 1 and vent port 3 and also has a plunger pump (second supply port 2) for feeding the organic peroxide and so on. D is an outlet of a die. In FIG. 4, the direction along the first supply port to the outlet of die points downstream of the extruder. A water pipe for cooling is placed each of the cylinder block. A heater is placed outside the block in order to control temperature.

Figure 6:
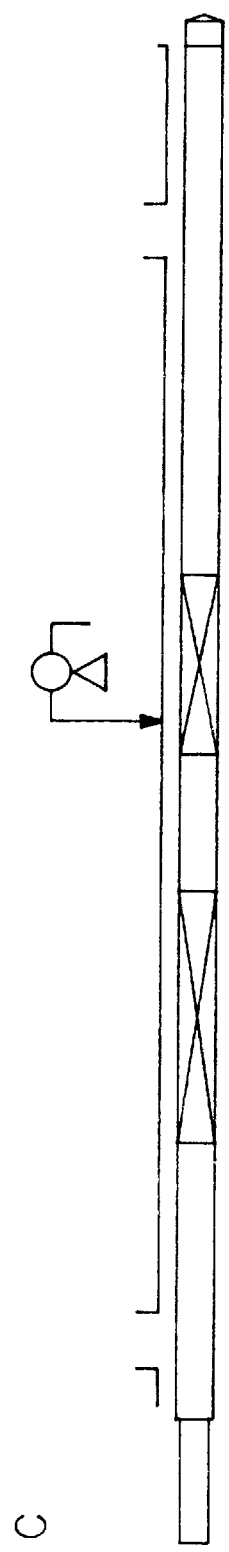
FIG. 6 is a schematic view of screw pattern C.
Figure 7:
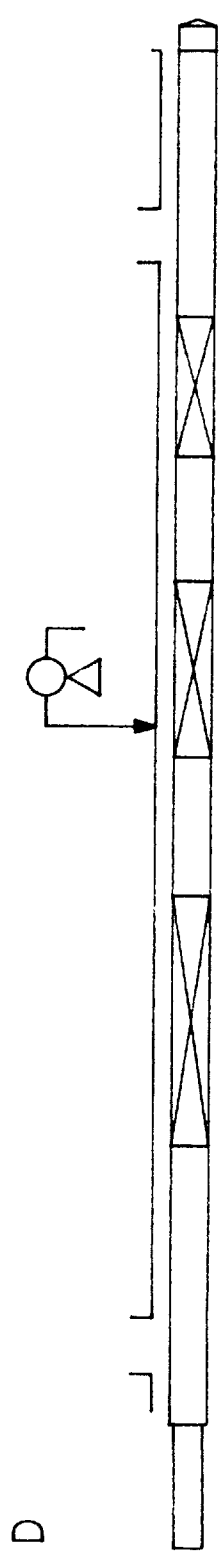
FIG. 7 is a schematic view of screw pattern D.
Figure 8:
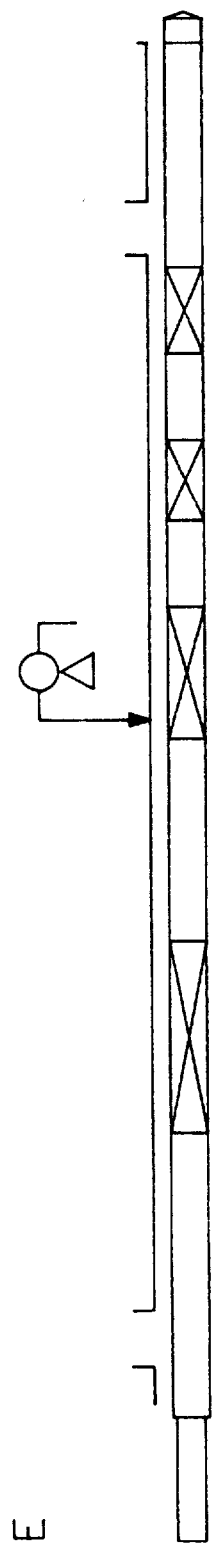
FIG. 8 is a schematic view of screw pattern E.

The cylinder in FIG. 8 has an L/D of 42 and other cylinders in FIGS. 5–7 and 9 have L/Ds of 38.5 as in FIG. 4.

(2) Screw patterns

A: The kneading zone within the dispersion area comprises forward kneading disks and backward kneading disks and the kneading zone within the dynamically cross-linking area comprises forward kneading disks and perpendicularly intersecting kneading disks (FIG. 4).

The thickness of the thinnest disk within the dynamically cross-linking area is 11.8 mm for TEX44 and 17.3 mm for TEX65.

B: The pattern is same as that of screw pattern A except that the forward kneading disks within the dynamically cross-linking area of the screw pattern A are replaced by thinner forward kneading disks (FIG. 5).

The thickness of the thinnest disk within the dynamically cross-linking area is 9.4 mm for TEX44 and 13.8 mm for TEX65.

C: The pattern is same as that of pattern B except that the thickness and number of the forward kneading disks and perpendicularly intersecting disks within the dynamically cross-linking of the screw pattern B area are changed (FIG. 6).

The thickness area of the thinnest disk within the dynamically cross-linking area is 4.7 mm for TEX44 and 6.9 mm for TEX65.

D: The pattern is same as that of pattern C except that a second kneading zone is inserted within the dynamically cross-linking area of the screw pattern C (FIG. 7).

The thickness of the thinnest disk within the dynamically cross-linking area is 4.7 mm for TEX44, 6.9 mm for TEX65 and 9.7 mm for TEX90.

E: The pattern is same as that of pattern D except that the number of forward kneading disks in the second kneading zone is decreased and a third kneading zone is inserted within the dynamically cross-linking area of the screw pattern D (FIG. 8).

The thickness of the thinnest disk within the dynamically cross-linking area is 9.7 mm for TEX90.

Figure 9:
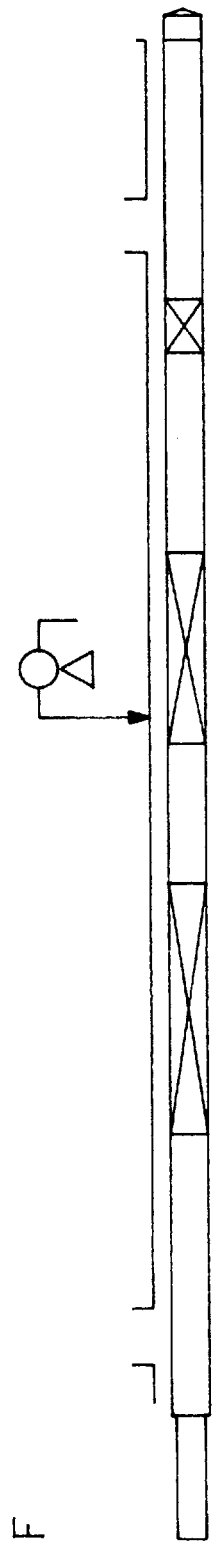
FIG. 9 is a schematic view of screw pattern F.

F: The pattern is same as that of pattern C including the dispersion area except that thinner forward kneading disks are used and a second kneading zone is inserted within the dynamically cross-linking area of the screw pattern C (FIG. 9).

The thickness of the thinnest disk within the dynamically cross-linking area is 7.2 mm for TEX90.

Example 1

To a 4% (by weight) hexane solution of ethylenepropylene-ethylidenenorbornene copolymer rubber (hereinafter, referred to as EPDM) [$ML_{1+4}100°$ C.=143, propylene content=30% by weight, iodine value=10] was added 40 parts by weight of mineral oil plasticizer (Diana process oil PW-380, manufactured by Idemitu Kosan Co.) per 100 parts by weight of EPDM. Then the solvent was removed by steam-stripping to give oil extended EPDM (viscosity=78), which was pulverized with a mill to give granular oil extended rubber.

Then, 100 parts by weight of the granular oil extended rubber, 43 parts by weight of crystalline polypropylene having a MFR of 2 g/10 minutes (230° C., load 2.16 kg) and 0.29 part by weight of N,N-m-phenylenebismaleimide were mixed with a super mixer (manufactured by Kawata Seisakusyo) for 30 seconds.

The mixture was supplied from the first supply port of the twin-screw kneader shown in FIG. 4 at a rate of 70 kg/hr. From the second supply port (plunger pump) was supplied a 30% by weight dilution (PO-1) of 2,5-dimethyl-2,5-di (tertbutyl-peroxy)hexane (hereinafter, referred to as "organic peroxide") diluted with mineral oil (Diana process oil PW-90, paraffin oil manufactured by Idemitu Kosan Co.) at a rate of 138 g/hr to effect dynamic cross-linking and the product was pelletized. The pellets were molded into an extrusion sheet and the external appearance of molding was evaluated. The results of evaluation and the relation to conditions for production are shown in Table 1.

Examples 2–18 and Comparative Examples 1–4

The procedure of evaluation in Example 1 was repeated except that the size of the extruder and the conditions for production were changed.

The materials for charge into the extruder had the same ratio and only the conditions for production by extruder such as feeding amount were changed. The results of evaluation and the conditions for production are shown in Tables 1–5.

TABLE 1

| | Example | | | |
|---|---|---|---|---|
| | 1 | 2 | 3 | 4 |
| Extruder used | TEX44 | TEX44 | TEX44 | TEX44 |
| Amount extruded kg/hr | 70 | 70 | 70 | 70 |
| Screw rotation rpm | 238 | 238 | 238 | 238 |
| Screw pattern | A | B | C | D |
| $T_{min}$ mm | 11.8 | 9.4 | 4.7 | 4.7 |
| Number of KD | 34 | 37 | 41 | 41 |
| Number of α | 23 | 25 | 33 | 33 |
| T mm | 13.8 | 11.3 | 5.7 | 5.7 |
| α/T | 1.7 | 2.2 | 5.8 | 5.8 |
| Number of β | 1 | 1 | 1 | 2 |
| αβγ/T | 115 | 153 | 399 | 799 |
| $\gamma_{max}$ $sec^{-1}$ | 1270 | 1270 | 1270 | 1270 |
| Resin temperature °C. | 247 | 244 | 241 | 255 |
| [Evaluation] | | | | |
| Surface texture of extruded sheet | ○ | ○ | ○ | ◎ |
| Fish eye in extruded sheet | ◎ | ○ | ○ | ◎ |

TABLE 2

| | Example | | | |
|---|---|---|---|---|
| | 5 | 6 | 7 | 8 |
| Extruder used | TEX44 | TEX44 | TEX44 | TEX44 |
| Amount extruded kg/hr | 70 | 70 | 70 | 70 |
| Screw rotation rpm | 310 | 310 | 310 | 310 |
| Screw pattern | A | B | C | D |
| $T_{min}$ mm | 11.8 | 9.4 | 4.7 | 4.7 |
| Number of KD | 34 | 37 | 41 | 41 |
| Number of α | 23 | 25 | 33 | 33 |
| T mm | 13.8 | 11.3 | 5.7 | 5.7 |
| α/T | 1.7 | 2.2 | 5.8 | 5.8 |
| Number of β | 1 | 1 | 1 | 2 |
| αβγ/T | 150 | 199 | 521 | 1042 |
| $\gamma_{max}$ $sec^{-1}$ | 1660 | 1660 | 1660 | 1660 |
| Resin temperature °C. | 253 | 251 | 248 | 264 |
| [Evaluation] | | | | |
| Surface texture of extruded sheet | ◎ | ◎ | ○ | ◎ |
| Fish eye in extruded sheet | ○ | ◎ | ◎ | ◎ |

TABLE 3

| | Comparative Example | | Example | |
|---|---|---|---|---|
| | 1 | 2 | 9 | 10 |
| Extruder used | TEX65 | TEX65 | TEX65 | TEX65 |
| Amount extruded kg/hr | 163 | 163 | 163 | 163 |
| Screw rotation rpm | 174 | 174 | 174 | 174 |
| Screw pattern | A | B | C | D |
| $T_{min}$ mm | 17.3 | 13.8 | 6.9 | 6.9 |
| Number of KD | 34 | 37 | 41 | 41 |
| Number of α | 23 | 25 | 33 | 33 |
| T mm | 20.3 | 16.6 | 8.4 | 8.4 |
| α/T | 1.1 | 1.5 | 3.9 | 3.9 |
| Number of β | 1 | 1 | 1 | 2 |
| αβγ/T | 57 | 75 | 196 | 393 |
| $\gamma_{max}$ $sec^{-1}$ | 1340 | 1340 | 1340 | 1340 |
| Resin temperature °C. | 243 | 250 | 239 | 262 |
| [Evaluation] | | | | |
| Surface texture of extruded sheet | x | x | ○ | ◎ |
| Fish eye in extruded sheet | x | Δ | ◎ | ○ |

TABLE 4

|  | Comparative Example | | Example | |
|---|---|---|---|---|
|  | 3 | 4 | 11 | 12 |
| Extruder used | TEX65 | TEX65 | TEX65 | TEX65 |
| Amount extruded kg/hr | 163 | 163 | 163 | 163 |
| Screw rotation rpm | 227 | 227 | 227 | 227 |
| Screw pattern | A | B | C | D |
| $T_{min}$ mm | 17.3 | 13.8 | 6.9 | 6.9 |
| Number of KD | 34 | 37 | 41 | 41 |
| Number of $\alpha$ | 23 | 25 | 33 | 33 |
| T mm | 20.3 | 16.6 | 8.4 | 8.4 |
| $\alpha/T$ | 1.1 | 1.5 | 3.9 | 3.9 |
| Number of $\beta$ | 1 | 1 | 1 | 2 |
| $\alpha\beta\gamma/T$ | 75 | 99 | 259 | 519 |
| $\gamma_{max}$ sec$^{-1}$ | 1740 | 1740 | 1740 | 1740 |
| Resin temperature °C. | 255 | 260 | 249 | 272 |
| [Evaluation] | | | | |
| Surface texture of extruded sheet | × | × | ○ | ⊚ |
| Fish eye in extruded sheet | × | × | ⊚ | ⊚ |

TABLE 5

|  | Example | | | | | |
|---|---|---|---|---|---|---|
|  | 13 | 14 | 15 | 16 | 17 | 18 |
| Extruder used | TEX90 | TEX90 | TEX90 | TEX90 | TEX90 | TEX90 |
| Amount extruded kg/hr | 340 | 340 | 340 | 340 | 340 | 340 |
| Screw rotation rpm | 132 | 132 | 132 | 197 | 197 | 197 |
| Screw pattern | D | E | F | D | E | F |
| $T_{min}$ mm | 9.7 | 9.7 | 7.2 | 9.7 | 9.7 | 7.2 |
| Number of KD | 41 | 41 | 63 | 41 | 41 | 63 |
| Number of $\alpha$ | 33 | 33 | 55 | 33 | 33 | 55 |
| T mm | 11.7 | 11.7 | 7.9 | 11.7 | 11.7 | 7.9 |
| $\alpha/T$ | 2.8 | 2.8 | 7.0 | 2.8 | 2.8 | 7.0 |
| Number of $\beta$ | 2 | 3 | 2 | 2 | 3 | 2 |
| $\alpha\beta\gamma/T$ | 214 | 322 | 529 | 322 | 482 | 794 |
| $\gamma_{max}$ sec$^{-1}$ | 1240 | 1240 | 1240 | 1840 | 1840 | 1840 |
| Resin temperature °C. | 266 | 268 | 262 | 296 | 266 | 275 |
| [Evaluation] | | | | | | |
| Surface texture of extruded sheet | ○ | ○ | ○ | ⊚ | ⊚ | ⊚ |
| Fish eye in extruded sheet | ⊚ | ⊚ | ⊚ | ○ | ⊚ | ⊚ |

(Notes)
$T_{min}$: Thickness (mm) of a disk having a minimum thickness among the forward kneading disks in the first kneading zone within the dynamically cross-linking area
KD: Total number of the kneading disks in the first kneading zone within the dynamically cross-linking area
$\alpha$: Number of the forward kneading disks in the first kneading zone within the dynamically cross-linking area
T: Average thickness (mm) per disk of the forward kneading disks in the first kneading zone within the dynamically cross-linking area
$\beta$: Number of the kneading zones within the dynamically cross-linking area
$\gamma_{max}$: Maximum shear rate in the kneading disk region in the kneading zones within the dynamically cross-linking area

What is claimed is:

1. A process for producing a thermoplastic elastomer composition which comprises dynamically cross-linking an olefine copolymer rubber and an olefine plastic using a twin-screw extruder, which comprises one or more kneading zones within a dynamically cross-linking area and in which the first kneading zone among said zones comprises a screw with forward kneading disks having a minimum thickness ($T_{min}$) of less than 13 mm per disk.

2. The process for producing a thermoplastic elastomer composition according to claim 1, in which the first kneading zone within the dynamically cross-linking area is a twin-screw extruder comprising a screw having 10 or more kneading disks.

3. The process for producing a thermoplastic elastomer composition according to claim 1, in which the twin-screw extruder is one satisfying the following equation:

$$\alpha/T > 1.5$$

wherein $\alpha$ is the number of forward kneading disks of the first kneading zone within the dynamically cross-linking area, and T is an average thickness (mm) per forward kneading disk in the first kneading zone within the dynamically cross-linking area.

4. The process for producing a thermoplastic elastomer composition according to claim 1, in which the twin-screw extruder is one satisfying the following equation:

$$\alpha \times \beta \times \gamma/T > 100$$

wherein
- $\alpha$ is the number of forward kneading disks of the first kneading zone within the dynamically cross-linking area,
- $\beta$ is the number of kneading zones within the dynamically cross-linking area,
- $\gamma$ is a shear rate (sec$^{-1}$) in the kneading disk region in the kneading zones within the dynamically cross-linking area, and T is an average thickness (mm) per forward kneading disk in the first kneading zone within the dynamically cross-linking area.

5. The process for producing a thermoplastic elastomer composition according to claim 3 or 4, in which the maximum shear rate provided by kneading within the dynamically cross-linking area in the twin-screw extruder is 500 sec$^{-1}$ or more and 2,000 sec$^{-1}$ or less.

6. The process for producing a thermoplastic elastomer composition according to claim 3 or 4, in which the olefine copolymer rubber and the olefine plastic are previously melt kneaded in the upstream of the twin-screw extruder and then an organic peroxide is fed in the downstream thereof to effect cross-linking.

7. The process for producing a thermoplastic elastomer composition according to claim 3 or 4, in which weight ratio of the olefine copolymer rubber and the olefine plastic is 20–95:80–5.

8. The process for producing a thermoplastic elastomer composition according to claim 3 or 4, in which the Mooney viscosity at 100° C. ($ML_{1+4}100°$ C.) of the olefine copolymer rubber is 30–350.

9. The process for producing a thermoplastic elastomer composition according to claim 3 or 4, in which the olefine copolymer rubber is an oil extended olefine copolymer rubber.

10. The process for producing a thermoplastic elastomer composition according to claim 3 or 4, in which the olefine plastic is polypropylene or a propylene-α-olefine copolymer.

* * * * *

UNITED STATES PATENT AND TRADEMARK OFFICE
CERTIFICATE OF CORRECTION

PATENT NO. : 5,847,052  
APPLICATION NO. : 08/721958  
DATED : December 8, 1998  
INVENTOR(S) : Tatsuo Hamanaka et al.

Page 1 of 1

It is certified that error appears in the above-identified patent and that said Letters Patent is hereby corrected as shown below:

<u>Column 10, line 27</u>:

In the table, the change "TEX44BCT" to --TEX44HCT--

<u>Column 13, line 20</u>:

In TABLE 4, change "Surface texture of extruded sheet × ×" to

-- Surface texture of extruded sheet Δ Δ --

Signed and Sealed this

Thirty-first Day of March, 2009

JOHN DOLL  
*Acting Director of the United States Patent and Trademark Office*